US012766556B2

(12) United States Patent
Bhadwal et al.

(10) Patent No.: US 12,766,556 B2
(45) Date of Patent: Oct. 20, 2026

(54) ULTRASONIC TRANSDUCERS, MATCHING LAYERS, AND RELATED METHODS

(71) Applicants: Neelesh Bhadwal, Toronto (CA); Ridha Ben-Mrad, Toronto (CA); Kamran Behdinan, Toronto (CA)

(72) Inventors: Neelesh Bhadwal, Toronto (CA); Ridha Ben-Mrad, Toronto (CA); Kamran Behdinan, Toronto (CA)

( * ) Notice: Subject to any disclaimer, the term of this patent is extended or adjusted under 35 U.S.C. 154(b) by 735 days.

(21) Appl. No.: 18/203,008

(22) Filed: May 29, 2023

(65) Prior Publication Data

US 2023/0390803 A1 Dec. 7, 2023

Related U.S. Application Data

(60) Provisional application No. 63/347,805, filed on Jun. 1, 2022.

(51) Int. Cl.
*B06B 1/06* (2006.01)

(52) U.S. Cl.
CPC .................................... *B06B 1/067* (2013.01)

(58) Field of Classification Search
CPC ........................................................ B06B 1/06
See application file for complete search history.

(56) References Cited

U.S. PATENT DOCUMENTS 6,307,302 B1 * 10/2001 Toda ...................... G10K 11/02 310/334
6,685,647 B2 * 2/2004 Savord .................. B06B 1/0677 600/459
2020/0186937 A1 * 6/2020 Kent ........................ H04B 1/40
2022/0233168 A1 * 7/2022 Haque .................. A61B 8/5207

FOREIGN PATENT DOCUMENTS

WO WO2001/008237 A1 2/2001

OTHER PUBLICATIONS

"Narrowband impedance matching layer for high efficiency thickness mode ultrasonic transducers," IEEE Ultrasonics Symposium Proceedings 2001—M. Toda.

* cited by examiner

*Primary Examiner* — J. San Martin
(74) *Attorney, Agent, or Firm* — Nasser Ashgriz; UIPatent Inc.

(57) ABSTRACT

A resonant type transducer transmitting or receiving narrowband continuous waves into or from a propagation medium, comprising a piezoelectric or electrostrictive vibrator having a specific acoustic impedance; a single matching layer or multiple matching layers contacting the piezoelectric or electrostrictive vibrator as well as the radiation medium to maximise power transfer to and from the transducer and the propagation medium; The specific acoustic impedance of the matching layers and propagation medium is complex conjugate to the specific acoustic impedance of the piezoelectric or electrostrictive vibrator and backing/backings at the frequency of operation resulting in reflection of the travelling wave in the layers resulting in in-phase addition and maximum power transfer. The matching layers cause increased power output and receiver sensitivity for resonant type transducers.

16 Claims, 13 Drawing Sheets

ULTRASONIC TRANSDUCERS, MATCHING LAYERS, AND RELATED METHODS

FIELD OF THE INVENTION

This invention relates to ultrasonic transducers, and more particularly to narrowband continuous wave ultrasonic transducers having improved coupling of ultrasonic energy between the propagation medium and transducer.

BACKGROUND OF THE INVENTION

Typically, two types of longitudinal (compression) ultrasonic waves may be produced from piezoelectric or electrostrictive transducers, continuous waves, and pulse waves. Pulse waves are short in the time domain and wideband in the frequency domain. Continuous waves are long in the time domain and narrowband in the frequency domain. Narrowband resonant ultrasonic transducers are more suitable for continuous wave generation when compared to wideband transducers because narrowband transducers have higher output power and peak sensitivity.

Some applications of continuous wave ultrasound are: (i) Ultrasound power transfer e.g., transcutaneous energy transfer; (ii) Doppler shift measurements; (iii) Ablation of unwanted cells (e.g., cancer cells) via focusing the waves onto a small area, and Flow rate measurements.

When sound travels from one medium to another, a portion of the sound may be reflected. Energy may be reflected back into an ultrasonic transmitter from the propagation medium at the transmitter propagation medium interface. Energy travelling from a propagating medium into a receiver transducer may be reflected back into the propagating medium at the receiver transducer propagating medium interface. To increase energy transfer between an ultrasonic transducer and propagation medium an "acoustic matching layer" is placed in between the piezoelectric material and the propagation medium.

For a wideband transducer an acoustic matching layer is a quarter wavelength thick (at resonance frequency) and has a characteristic acoustic impedance that is the geometric mean of the piezoelectric material and propagation medium. The characteristic impedance of a material is defined by Eq. 1. The matching layer impedance is calculated by Eq. 2.

$$Z=\rho c \qquad \text{Eq. 1}$$

Where Z, ρ and c are the characteristic impedance, density, and speed of sound in the material, respectively.

$$Z_{matching}=\sqrt{Z_p Z_m} \qquad \text{Eq. 2}$$

where $Z_{matching}$, $Z_p$ and $Z_m$ are the characteristic impedance of the matching layer, piezoelectric material and propagating medium, respectively.

A narrowband transducer producing continuous wave ultrasonic waves has a specific acoustic impedance which is different from the characteristic impedance in Eq. 1 at resonance and it is given by Eq. 3 as shown in the published paper M. Toda, "Narrowband impedance matching layer for high efficiency thickness mode ultrasonic transducers," 2001 *IEEE Ultrasonics Symposium. Proceedings. An International Symposium* (Cat. No. 01CH37263), 2001, pp. 1173-1176 vol. 2, doi: 10.1109/ULTSYM.2001.991927 and patent WO2001008237A1. Specific acoustic impedance at a point is defined as the effective sound pressure at the point divided by the effective particle velocity at the point where $\overline{P}$ is the acoustic pressure and $\overline{u}$ is the acoustic vibrational velocity. The magnitude of the complex number gives the specific acoustic impedance value and the phase represent the phase difference between the pressure and velocity wave. At resonance, the displacement is large and hence $Z_r$ is lower than the characteristic impedance of the piezoelectric material.

$$Z_r=\frac{\overline{P}}{\overline{u}} \qquad \text{Eq. 3}$$

An example on how to calculate the specific acoustic impedance of a piezoelectric material and backing in a transducer is shown in FIG. 1. When a piezoelectric, matching or backing layer is operating in continuous wave narrowband mode its mechanical quality factor Q must be accounted for in the calculation and hence the modified speed of the sound in the material is given by:

$$v_p=v_p'(1+j/2Q) \qquad \text{Eq. 4}$$

where $v_p'$ is the speed of sound in the material, $j=\sqrt{-1}$ is the imaginary number, and Q is the mechanical quality factor. Q represents the loss in energy at resonance in the material due to the internal friction of the domains during expansion and contraction of the material. The calculated $v_p$ is multiplied by density of the material to find the impedance of the material.

First Eq. 5 is used to calculate the input impedance seen at the back of the piezoelectric material $Z_{in1}$ where $Z_L$, $Z_b$, $d_b$, $v_b$, ω is the characteristic impedance of the medium behind the backing, impedance of the backing material given by Eq. 4, times density, thickness of the backing material, modified speed of sound in the backing material and the angular frequency. Equation 6 is then used to calculate the input impedance seen at the front of the piezoelectric material $Z_{in2}$ where $Z_p$, $d_p$, $v_p$ are the impedance of the piezoelectric material (calculated by multiplying density with the result of equation 4), thickness of the piezoelectric material and modified speed of sound in the piezoelectric material calculated by Equation 4. This cascaded approach can be extended for multiple backing layers by use of the same equations.

$$Z_{in1}=Z_b\left(\frac{Z_L+jZ_b\tan\frac{\omega d_b}{v_b}}{Z_b+jZ_L\tan\frac{\omega d_b}{v_b}}\right) \qquad \text{Eq. 5}$$

$$Z_{in2}=Z_p\left(\frac{Z_{in1}+jZ_p\tan\frac{\omega d_p}{v_p}}{Z_p+jZ_{in1}\tan\frac{\omega d_p}{v_p}}\right) \qquad \text{Eq. 6}$$

For a narrowband transducer once the equivalent specific acoustic impedance $Z_{in2}$ is calculated at the front of the piezoelectric material there are two main techniques for matching layer design and selection.

Single acoustic matching layer: A quarter wavelength matching layer can be placed between the piezoelectric material and propagation medium which has a characteristic acoustic impedance equal to the geometric mean of the characteristic impedance of the propagating medium and the specific impedance at piezoelectric material-propagation medium interface due to the backing materials ($Z_{in2}(f_{resosance})$) at the resonance frequency, as shown in Eq. 7.

$$Z_{matching}=\sqrt{Z_{in2}(f_{resosance})Z_m} \qquad \text{Eq. 7}$$

where $Z_{matching}$ is the characteristic acoustic impedance of the matching layer and $Z_m$ is the characteristic impedance of the propagation medium. This calculation can lead to a matching layer characteristic impedance of less than 1 MRayl. For example, if a quarter wave thick backing layer of SS 316 and PVDF-TrFE resonant at 1.7 MHz is placed into water the matching layer would be required to have a characteristic impedance of 0.71 MRayls which can be achieved via artificially made materials for example composites such as air filled silicones or polyurethane. The inclusions in the composite may be lossy and led to scattering of sound.

Dual acoustic matching layers: A more practical design is dual matching layers. In this design the characteristic impedance of the matching layer closest to the piezoelectric is lower than the outer matching layer touching the propagation medium. This results in an effective low acoustic impedance. FIG. 2 shows the dual matching layers in contact with the radiation medium ($Z_L$). Matching layer 1 is in between matching layer 2 and the radiation medium while matching layer 2 is in between the vibrator layer and matching layer 1. The specific acoustic impedance $Z_{in4}(f_{resosance})$ of the dual matching layers and propagation medium at the vibrator-matching layer 2 interface is calculated via the same cascading approach as FIG. 1. Two materials are selected to be matching layer 1 and 2 such that the characteristic impedance of the matching layer 1 is less than that of matching layer 2. Then the thickness of both layers is varied until $Z_{in4}(f_{resosance})=Z_{in2}(f_{resosance})\cdot f_{resosance}$ is the resonance frequency of the transducer when no matching layers are applied. This condition provides a matched reflectionless condition.

The present invention provides a novel matching condition that results in a more narrowband and sensitive transducer. This results in a higher efficiency power transfer between ultrasound transducers and the propagation medium.

SUMMARY OF THE INVENTION

The present invention is a resonant type transducer comprising a piezoelectric or electrostrictive vibrator, and a method of making the same. This transducer has a specific acoustic impedance, and a single matching layer or multiple matching layers contacting the piezoelectric or electrostrictive vibrator as well as the radiation medium to efficiently transfer power to and from the transducer and the propagation medium. The specific acoustic impedance of the matching layers and propagation medium is complex conjugate to the specific acoustic impedance of the piezoelectric or electrostrictive vibrator, backing and radiation medium behind the backing at the frequency of operation.

The method for forming a resonant-type transducer with narrow bandwidth, high output/high receiver sensitivity to a propagation medium is also provided. The specific acoustic impedance of the matching layers and propagation medium is complex conjugate to the specific acoustic impedance of the piezoelectric or electrostrictive vibrator and backing at the frequency of operation.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

The ultrasound generating piezoelectric, relaxor material or electrostrictive material may be a crystal, ceramic, or polymer film such as PZT, PVDF, lithium niobate, PMN, PMN-PT among other materials. The medium of propagation may be a solid, liquid or gas such as water, tissue, steel, among others. The invention will work for any of these materials, but the following examples will use PVDF-TrFE as the piezoelectric vibrator with diameter 20 mm and thickness 330 μm (speed of sound=2250 m/s, density=1780 kg/m$^3$ & Q=10.5). SS 316 is used as the backing material with thickness 887 μm.

Figure 1:
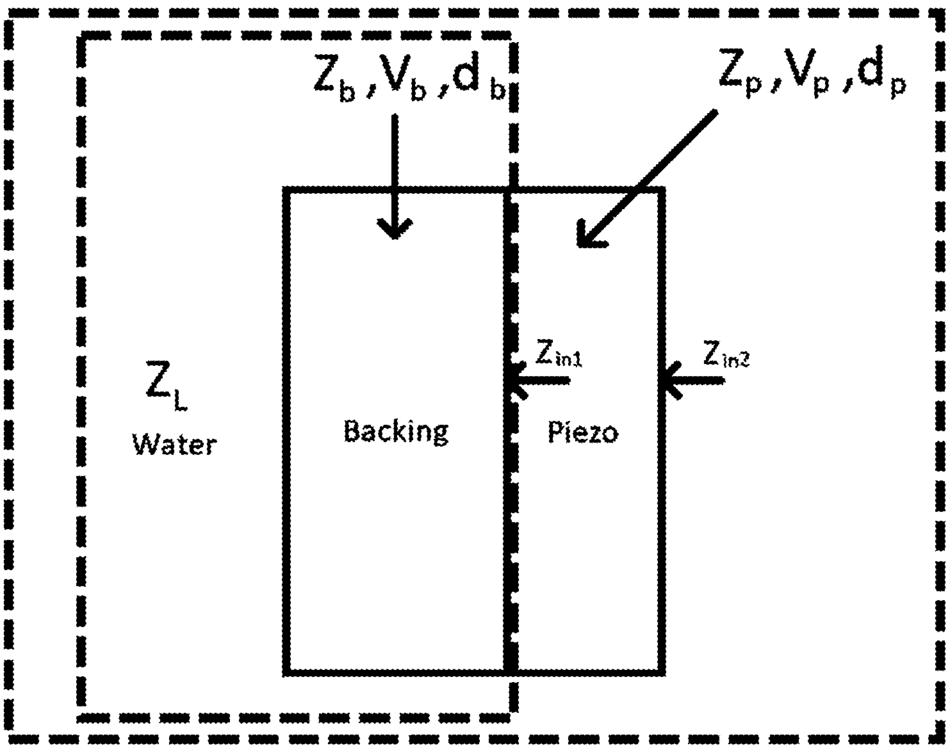
FIG. 1 (PRIOR ART)
FIG. 1 is a cross sectional view depicting how to calculate specific acoustic impedance of vibrator piezoelectric or electrostrictive material and backing of a prior art resonant transducer.
Figure 2:
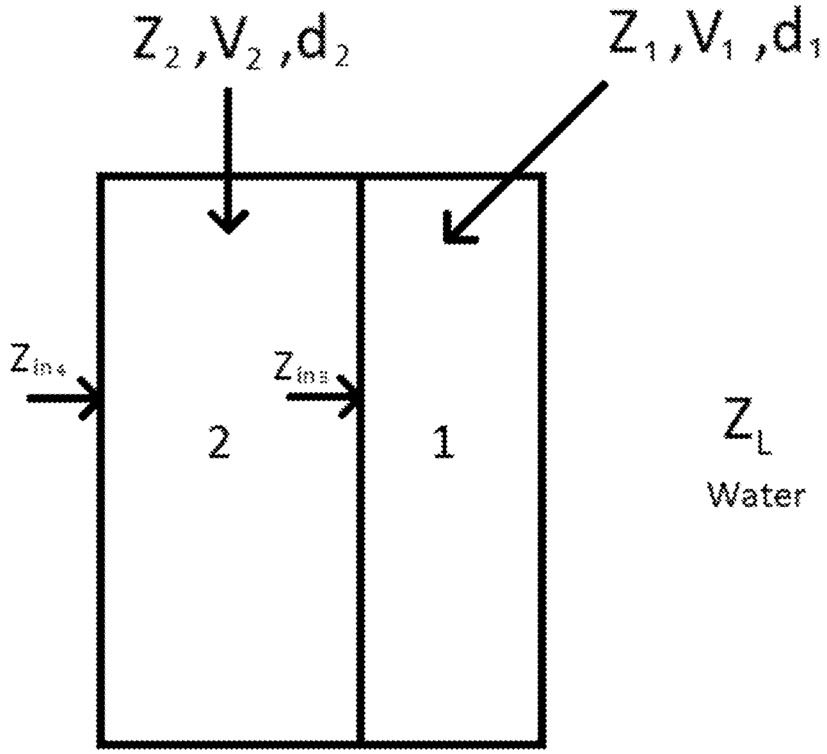
FIG. 2 (PRIOR ART)
FIG. 2 is a cross sectional view depicting how to calculate specific acoustic impedance of matching layers of a prior art resonant transducer.
Figure 3:
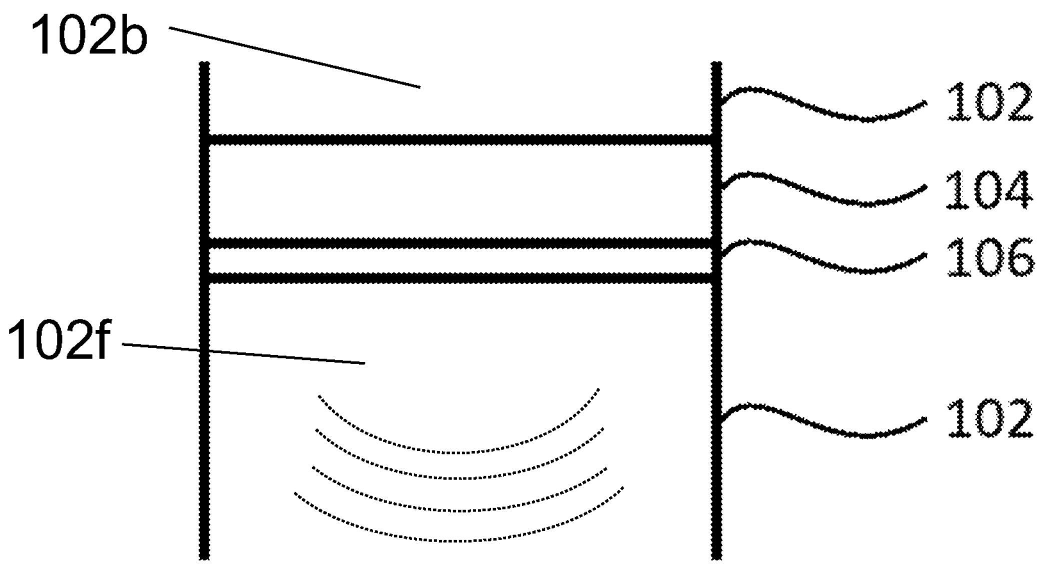
FIG. 3 (PRIOR ART)
FIG. 3 is a cross sectional view depicting a resonant transducer with no matching layers submerged in water.

FIG. 3 shows the structure of a resonant transducer with PVDF-TrFE as the piezoelectric element (106) along with a SS 316 backing (104) and in a propagation medium of water (102), with front propagating waves 102*f*. The propagation medium (102) on the back (102*b*) and (102*f*) can be the same or different. No matching layers are present. Stainless steel has an acoustic impedance of 47 MRayls and as a backing serves to reflect any backward traveling sound wave out the front of the transducer. This is a resonant transducer. The thicknesses of the backing and piezoelectric layer are both a quarter wavelength at 1.7 MHz. Note the layers are discs with a diameter of 20 mm.

Figure 4:
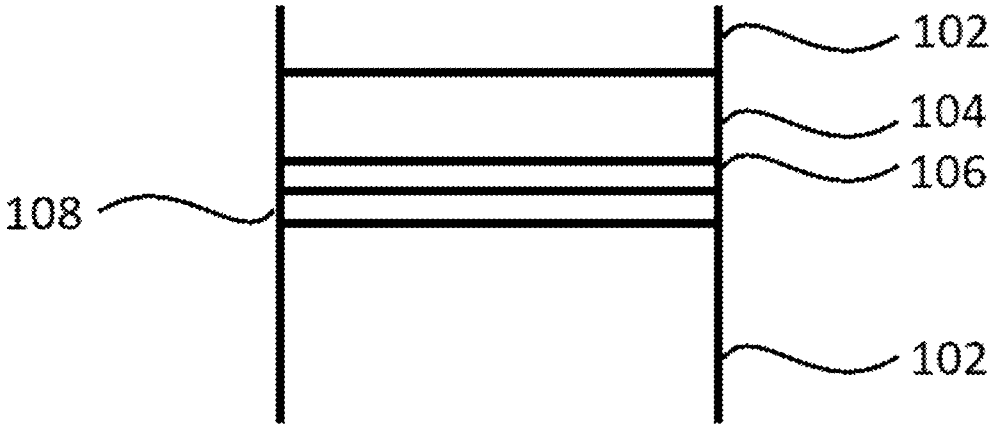
FIG. 4 (PRIOR ART)
FIG. 4 is a cross sectional view depicting a resonant transducer with a traditional quarter wave matching layer submerged in water.
Figure 5:
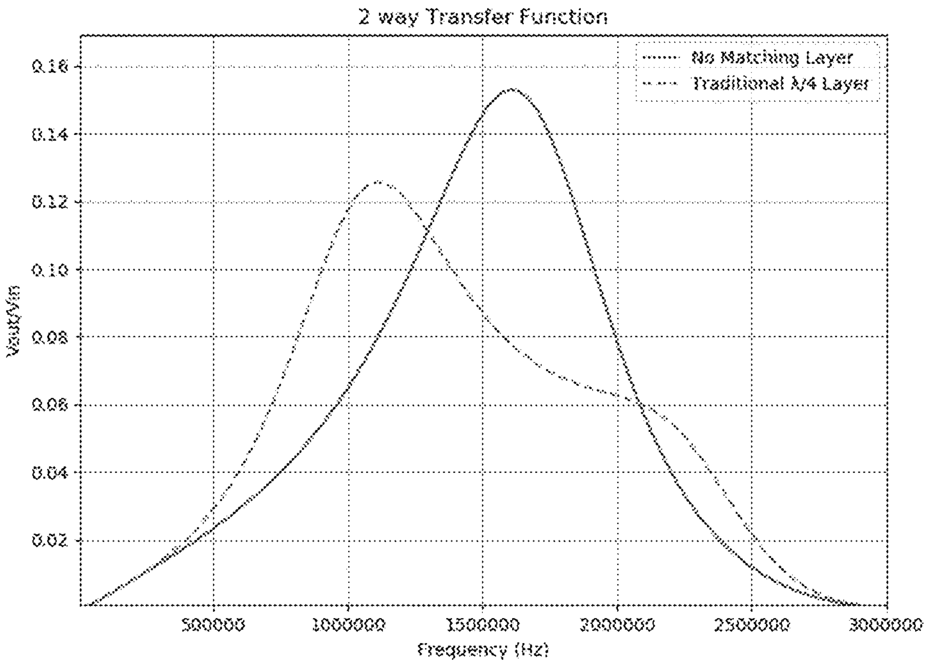
FIG. 5 (PRIOR ART)
FIG. 5 is a graph of the two-way transfer function of a resonant transducer with no matching layers compared to one with a traditional quarter wave matching layer.

In FIG. 4, the structure of a transducer with PVDF-TrFE as the piezoelectric element along with a SS 316 backing and a matching layer (108) is shown in a propagation medium of water. A conventional matching layer with thickness equal to a quarter wavelength and acoustic impedance of 2.4 MRayls calculated from Eq. 2. The transducer in FIG. 3 and FIG. 4 are the same except for the matching layer in FIG. 4. The two way transmit-receive transfer function simulated using a KLM model for the transducer in FIG. 3 and FIG. 4 are shown in FIG. 5. As can be seen the addition of the traditional matching layer results in the bandwidth of the transfer function increasing but the sensitivity/peak output decreasing which is undesirable for a continuous wave broadband transducer.

Figure 6:
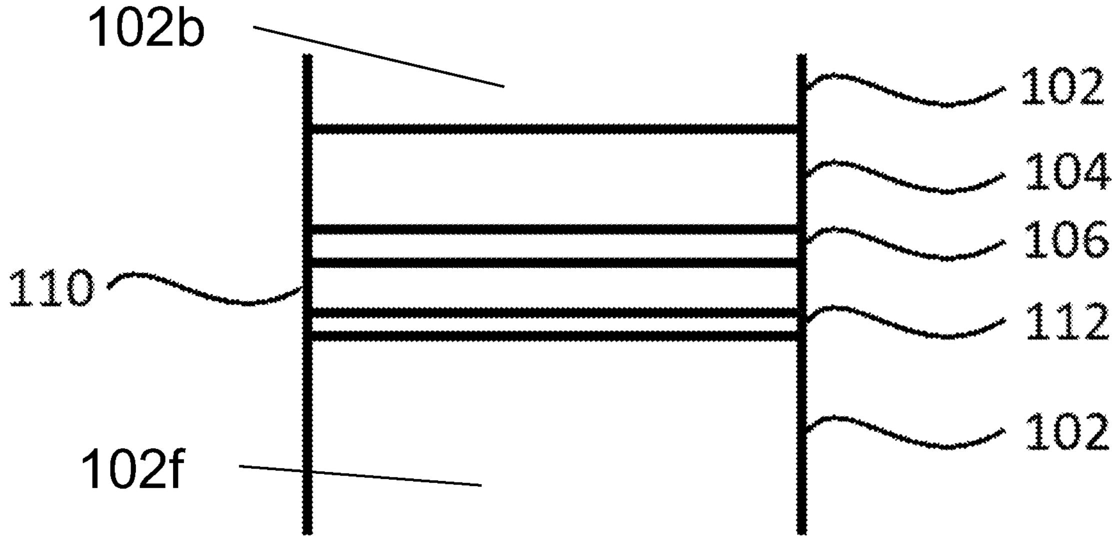
FIG. 6 (PRIOR ART)
FIG. 6 is a cross sectional view depicting a prior art resonant transducer with a low acoustic impedance matching layer attached to a high acoustic impedance matching layer submerged in water.

In FIG. 6, the structure of a transducer with PVDF-TrFE as the piezoelectric element along with a SS 316 backing and dual matching layers is shown in a propagation medium of water. The dual matching layers consist of polycarbonate (110) and aluminum (112). The polycarbonate layer is bonded to the PVDF-TrFE layer and has an acoustic impedance of 2.77 MRayl (Q=30) followed by aluminum with an acoustic impedance of 17 MRayl. The transducer in FIG. 6 is the same as the transducer in FIG. 3 except for the dual matching layers. The equivalent specific acoustic impedance of the PVDF-TrFE, SS 316 and water are calculated using Eq. 5 and Eq. 6. The calculated value of the characteristic impedance of the ideal single matching layer (single) would be 0.68 MRayl.

Figure 7:
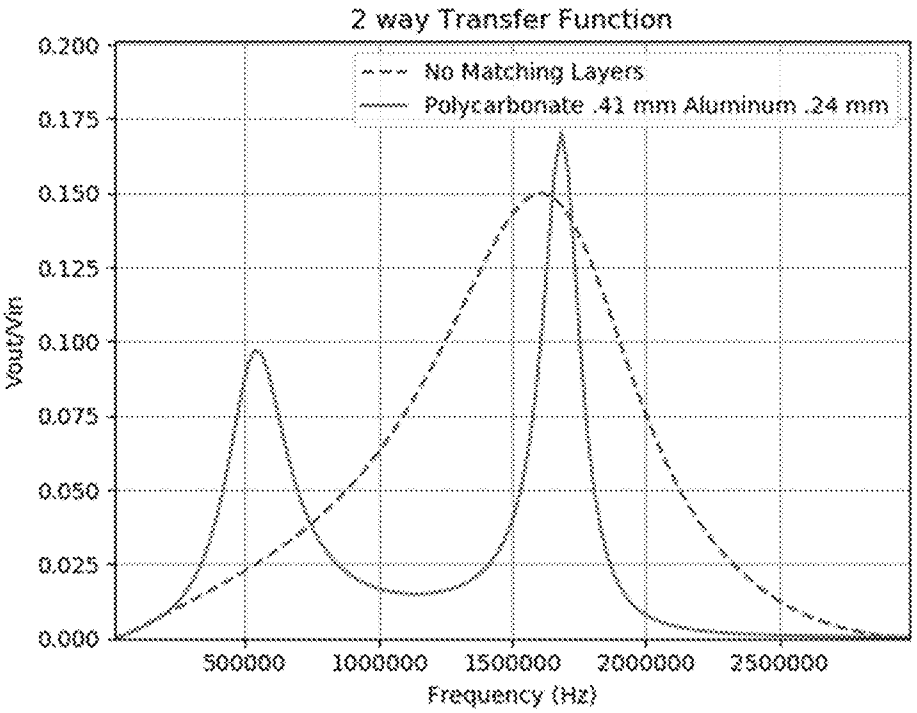
FIG. 7 (PRIOR ART)
FIG. 7 is a graph of the two-way transfer function of a resonant transducer with no matching layers compared to one with dual matching layers in prior art.
Figure 8:
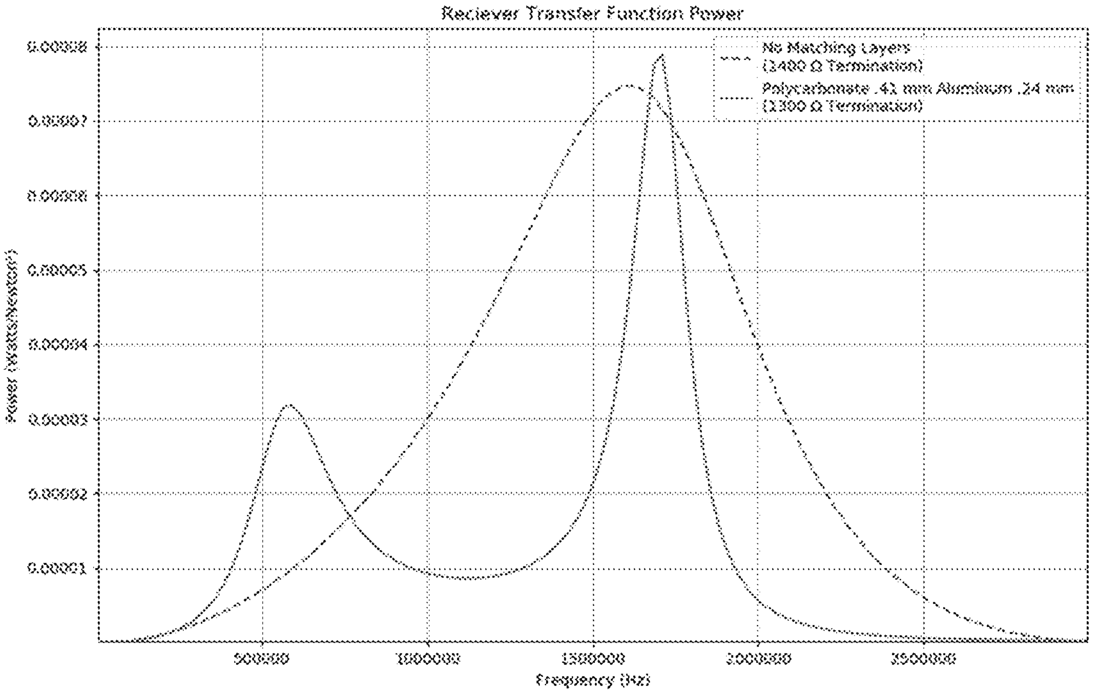
FIG. 8 (PRIOR ART)
FIG. 8 is a graph of the receiver electrical power output as a function of mechanical input of a resonant transducer with no matching layers compared to one with dual matching layers in prior art.

The alternative is to use a low impedance material with a high impedance material resulting in an effective lower impedance. In this example polycarbonate and aluminum were used. The thickness of the polycarbonate and aluminum layers were varied until the equivalence specific acoustic impedance of the dual matching layers and the water at the front (102*f*) of the transducer becomes equal to that of the back (102*b*) of the transducer at resonance frequency, 1.7 MHz. The two way transmit-receive transfer function (FIG. 7) as well as the receiver electrical power output as a function of mechanical input (FIG. 8) of the transducer in FIG. 3 and FIG. 6 is shown. As can be seen the bandwidth of the transfer function decreases and the sensitivity/peak output increases, which is desirable for a continuous wave broadband transducer when the dual matching layers are used as in prior art.

Figure 9:
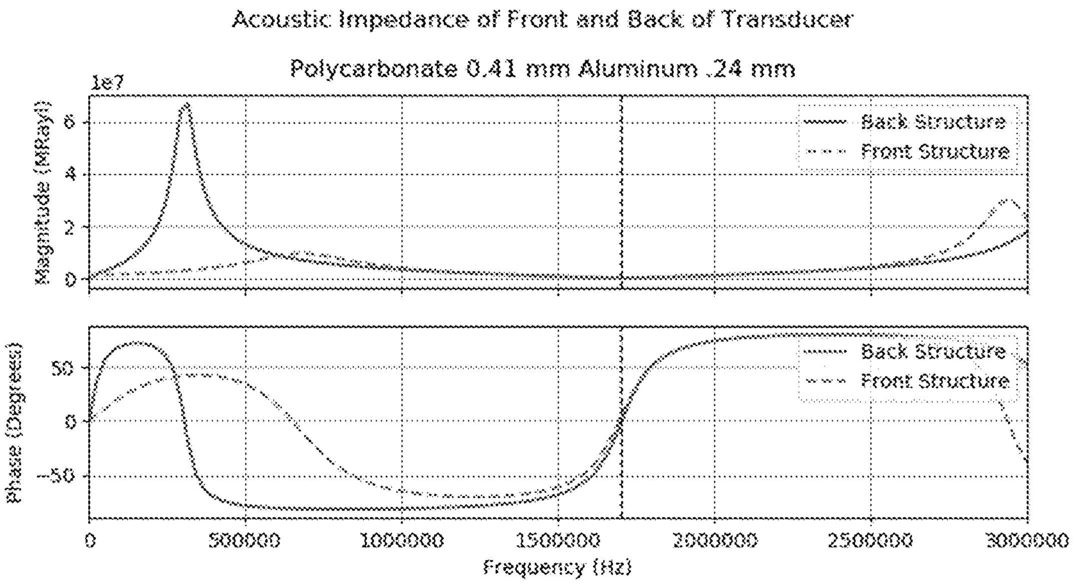
FIG. 9 (PRIOR ART)
FIG. 9 is a graph of the specific acoustic impedance of the front and back halves of the prior art transducer with dual matching layers.

FIG. 9 shows the specific acoustic impedance of the back part (PVDF-TrFE, SS316 and water) and front part (Polycarbonate, Aluminum and water) of the transducer in FIG. 6 as a function of frequency. The equivalence specific acoustic impedance has a real component as well as an imaginary component whose value varies between positive, negative and zero depending on frequency. At the resonance frequency the imaginary part of the specific acoustic impedance becomes zero (the phase of the specific acoustic impedance becomes zero) as indicated by the dashed vertical line in FIG. 9. There is a corresponding peak in FIG. 7 and FIG. 8 at the same frequency. In the patent WO2001008237A1 the specific acoustic impedances are matched when both are equal and have 0 imaginary component at the resonance frequency of the piezoelectric material. This is believed to be the condition for maximum power output, Eq. 8:

$$Z_{in2}(f_{resosance})=Z_{in4}(f_{resosance}) \quad \text{Eq. 8}$$

where $Z_{in4}$ and $Z_{in2}$ are equivalent specific acoustic impedances of the front and back of the transducer at the piezoelectric or electrostrictive material-matching layer interface. There are real numbers at $f_{resosance}$.

In this invention the equivalent specific acoustic matching condition for maximum power transfer is given by Eq. 9. The equivalent specific acoustic impedances of the front and back of the transducer at the piezoelectric or electrostrictive material-matching layer interface must be complex conjugates of each other at the frequency of matching for maximum power transfer at that frequency. f can be any frequency. The frequency at which maximum power transfer occurs globally can be different than the resonance frequency of the piezoelectric operated in air or with a backing and without matching layers and satisfies equation 9.

$$Z_{in2}(f)=Z_{in4}(f)^* \quad \text{Eq. 9}$$

where, $Z_{in2}(f)=X+jY$ and $Z_{in4}(f)=X-jY$, with X being the real part of the equivalent specific impedance of one side of the transducer, and Y being the imaginary part of the equivalent specific impedance of the other side of the transducer.

At the resonance frequency of the piezoelectric material and backing with no matching layers, Eq. 9 reduces to Eq. 8. Conjugate matching is a more general condition for matching and Eq. 8 is a special case of conjugate matching where the equivalent specific acoustic impedances are purely real numbers. The principle of maximum power transfer between complex conjugate circuit elements is found in electrical theory but has not been applied to ultrasonic matching layers. The reflection coefficients of traveling wave given by Eq. 10 do not represent the reflection of power when complex impedance are used as shown in papers J. Rahola, "Power Waves and Conjugate Matching," in *IEEE Transactions on Circuits and Systems II: Express Briefs*, vol. 55, no. 1, pp. 92-96, January 2008, doi: 10.1109/TCSII.2007.905420 and K. Kurokawa, "Power Waves and the Scattering Matrix," in *IEEE Transactions on Microwave Theory and Techniques*, vol. 13, no. 2, pp. 194-202, March 1965, doi: 10.1109/TMTT.1965.1125964. Eq. 11 is used to calculate the reflection coefficient of the propagating power when complex impedances are used.

$$R_{travelling\ wave} = \frac{Z_2 - Z_1}{Z_2 + Z_1} \quad \text{Eq. 10}$$

$$R_{power\ wave} = \frac{Z_2 - Z_1^*}{Z_2 + Z_1} \quad \text{Eq. 11}$$

As can be seen from Eq. 11 if the impedances are complex conjugates of each other, the power reflection coefficient is zero. In simple terms, when the matching layers are conjugately matched, any reflections of the travelling wave in the layers will be compensated for by another reflection in the layers to result in in phase addition and maximum power transfer.

Figure 10:
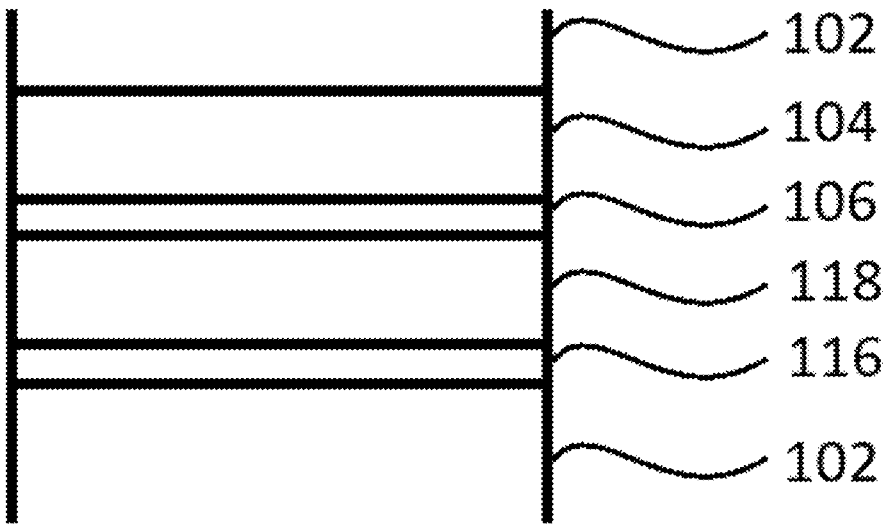
FIG. 10 is a cross sectional view depicting the current invention resonant transducer with a low acoustic impedance matching layer attached to a high acoustic impedance matching layer submerged in water.

In FIG. 10, the structure of a transducer with PVDF-TrFE as the piezoelectric element along with a SS 316 backing and dual matching layers is shown in a propagation medium of water. The dual matching layers consist of polycarbonate and aluminum. The polycarbonate layer (118) is bonded to the PVDF-TrFE layer and has an acoustic impedance of 2.77 MRayl followed by Aluminum (116) which has an acoustic impedance of 17 MRayl. The transducer in FIG. 3 and FIG. 10 are the same except for the matching layers in FIG. 10. The equivalent specific acoustic impedance of the PVDF-TrFE, SS 316 and water was calculated using Eq. 5 and Eq. 6. The thickness of the polycarbonate layer and aluminum were varied to obtain the maximum power transfer calculated via KLM model simulation. This occurs when the thickness of the polycarbonate layer is 0.7 mm and the aluminum is 0.2 mm. The equivalent specific acoustic impedance of the dual matching layers and the water at the front of the transducer is a complex conjugate of the equivalent specific acoustic impedance of the back of the transducer at the frequency of maximum power transfer.

Figure 11:
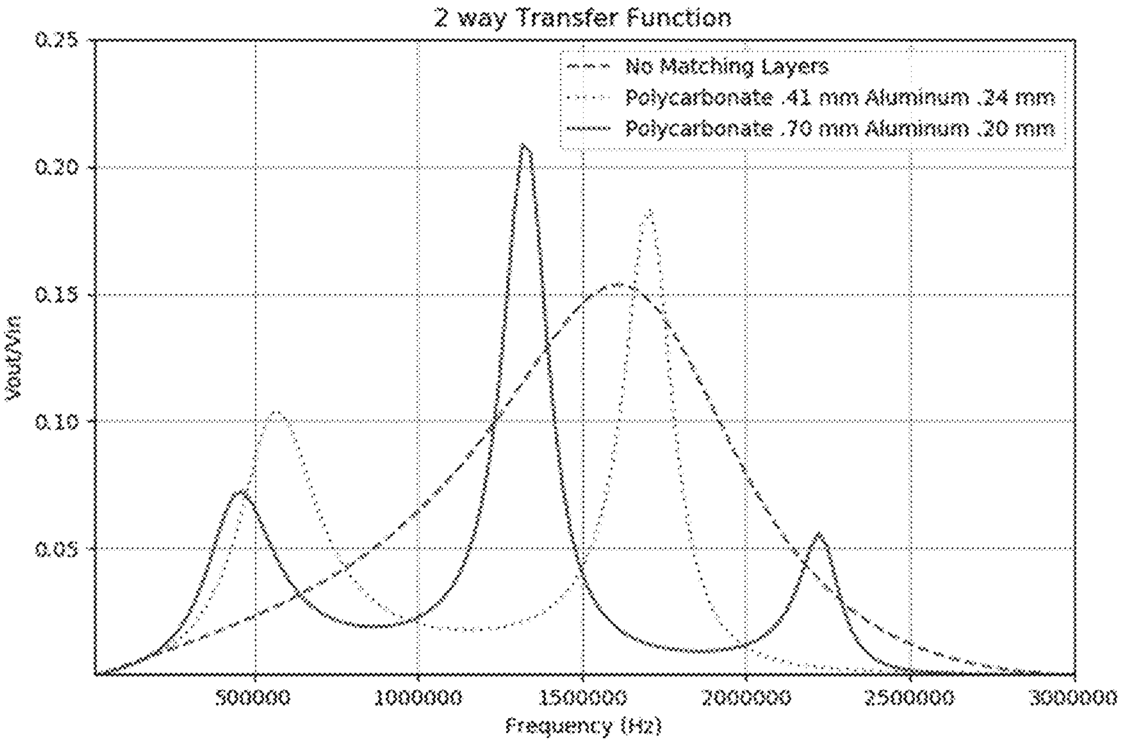
FIG. 11 is a graph of the two-way transfer function of a resonant transducer with no matching layers compared to one with dual matching layers in prior art as well as the current invention resonant transducer with a low acoustic impedance matching layer attached to a high acoustic impedance matching layer submerged in water.

The two-way transfer function of a resonant transducer with no matching layers in FIG. 3 compared to one with dual matching layers in prior art FIG. 6 as well as the current invention resonant transducer FIG. 10 submerged in water is shown in FIG. 11. The receiver electrical power output as a function of mechanical input of a resonant transducer with no matching layers in FIG. 3 compared to one with dual matching layers in prior art FIG. 6 as well as the current invention FIG. 10 submerged in water is shown in FIG. 12.

Figure 12:
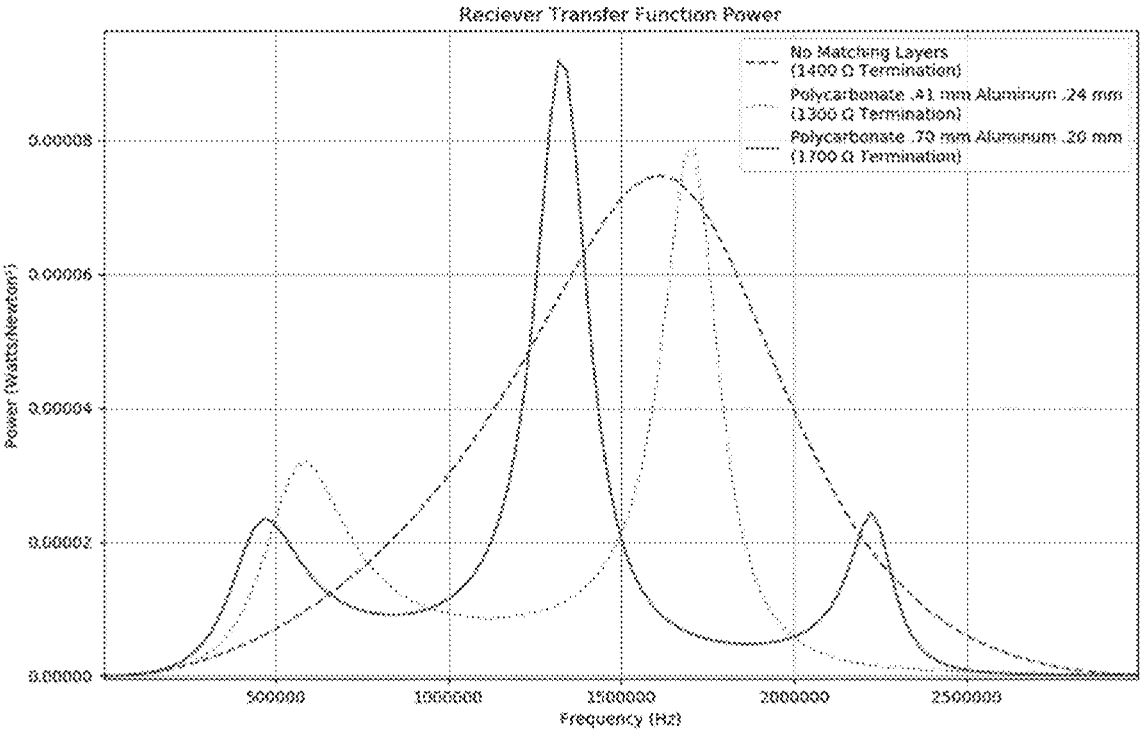
FIG. 12 is a graph of the receiver electrical power output as a function of mechanical input of a resonant transducer with no matching layers compared to one with dual matching layers in prior art as well as the current invention resonant transducer with a low acoustic impedance matching layer attached to a high acoustic impedance matching layer submerged in water.

FIG. 11 and FIG. 12 both show that the present invention has a higher peak sensitivity and efficiency than prior art. The resulting transducer is more narrowband, and the peak resonance is shifted down in frequency. This is beneficial for an application like ultrasonic power transfer as lower frequencies attenuate less in the propagation medium.

Figure 13:
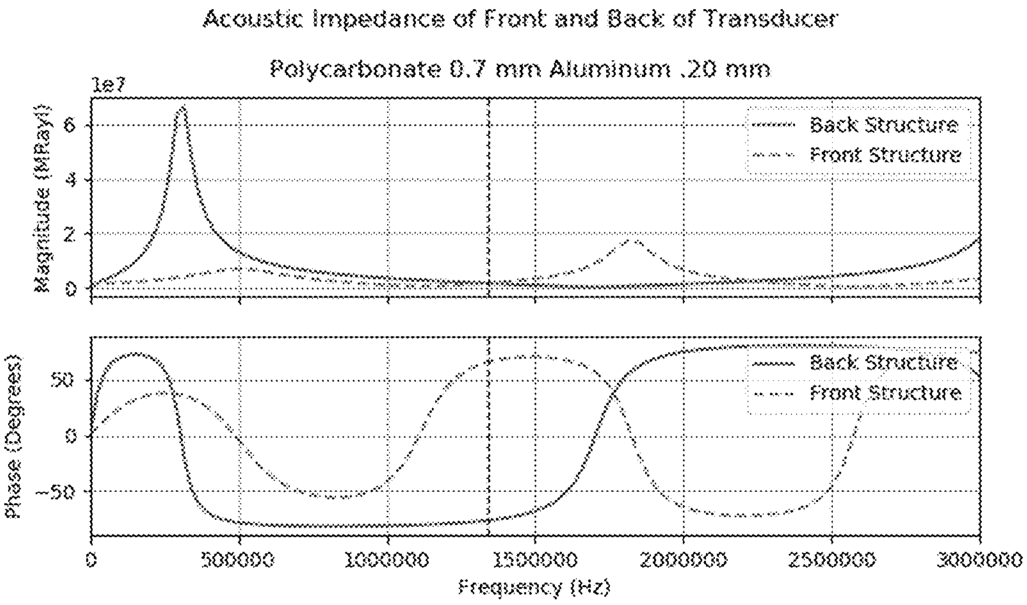
FIG. 13 is a graph of the specific acoustic impedance of the front and back halves of the current invention transducer with dual matching layers.

FIG. 13 shows the equivalent specific acoustic impedance of the back part (PVDF-TrFE, SS316 and water) and front part (Polycarbonate, Aluminum, and water) of the transducer in FIG. 10 as a function of frequency. Note at 1.34 MHz the vertical dashed line shows that the equivalent specific acoustic impedances are complex conjugates and there is a corresponding peak in FIG. 11 and FIG. 12 at that 1.1 MHz. KLM simulations with different pairs of materials for dual matching layers is conducted. The peak open circuit (OC) voltage and peak output power for the receiver transducer transfer function is found. Six different combinations of materials are studied, and the thickness of the matching layers as a fraction of wavelength at the frequency of maximum occurrence is shown in Table 1. Note at the maximum power and open voltage condition the input impedance of the front and back of transducer are complex conjugates in accordance with equation 8 and not purely real numbers as in equation 9.

TABLE 1

| Matching Layer 2 | Matching Layer 1 | | Thickness Low Impedance | Thickness High Impedance | Frequency of Occurrence (MHz) |
|---|---|---|---|---|---|
| Polyurethane | Polyester | Max Power | .35 λ | .177 λ | 1.489 |
| 1.8 MRayl | 3.42 MRayl | Max OC | .02 λ | .04 λ | .34 |
| 1700 m/s | 2520 m/s | Voltage | | | |
| Q = 28 | Q = 20 | | | | |
| Polyethylene | Polycarbonate | Max Power | .31 λ | .23 λ | 1.53 |
| 1.79 MRayl | 2.77 MRayl | Max OC | .35 λ | .24 λ | 1.39 |
| 1950 m/s | 2270 m/s | Voltage | | | |
| Q = 43 | Q = 30 | | | | |
| Polyethylene | Polyester Casting Resin | Max Power | .32 λ | .20 λ | 1.56 |
| 1.79 MRayl | 2.86 MRayl | Max OC | .40 λ | .21 λ | 1.416 |
| 1950 m/s | 2290 m/s | Voltage | | | |
| Q = 43 | Q = 20 | | | | |
| Polycarbonate | Aluminum | Max Power | .08 λ | .06 λ | .537 |
| 2.77 MRayl | 17 MRayl | Max OC | .06 λ | .09 λ | .415 |
| 2270 m/s | 6400 m/s | Voltage | | | |
| Q = 30 | | | | | |
| Polyurethane | SS316 | Max Power | .015 λ | .070 λ | .268 |
| 1.8 MRayl | 46 MRayl | Max OC | .02 λ | .034 λ | .366 |
| 1700 m/s | 5900 m/s | Voltage | | | |

In the examples shown, the radiation medium is water but the condition of matching will work in other fluids as well as in solids. It is understood that though the invention was described through a particular example many changes to the design, construction can be made without departing from the scope of the invention. The patent shall cover by suitable expression in the appended claims, features of patentable novelty that exist in the invention disclosed.

The invention claimed is:

1. A resonant type transducer, the transducer comprising:

a) a piezoelectric or an electrostrictive vibrator;

b) a backing layer acoustically coupled to a back side of the piezoelectric or the electrostrictive vibrator;

c) a backside propagation medium acoustically coupled with the backing layer;

d) a first equivalent acoustic impedance for a combination of the piezoelectric or the electrostrictive vibrator, the backing layer, and the backside propagation medium;

e) one or more matching layers coupled to a front side of the piezoelectric or the electrostrictive vibrator;

f) a front side propagation medium acoustically coupled to the one or more matching layers to transfer energy to and from the transducer and the front side propagation medium, g) a second equivalent acoustic impedance for a combination of the one or more matching layers, and the front side propagation medium, wherein the second equivalent acoustic impedance is a complex conjugate impedance to the first equivalent acoustic impedance.

2. The transducer according to claim 1, wherein thicknesses of the one or more matching layers are configured to obtain the second equivalent acoustic impedance that is a complex conjugate impedance to the first equivalent acoustic impedance.

3. The transducer according to claim 1, wherein materials of the one or more matching layers are configured to obtain the second equivalent acoustic impedance that is a complex conjugate impedance to the first equivalent acoustic impedance.

4. The transducer according to claim 1, wherein the thicknesses and materials of the one or more matching layers is configured to obtain the second equivalent acoustic impedance that is a complex conjugate impedance to the first equivalent acoustic impedance.

5. The transducer according to claim 1, wherein the propagation medium is a solid, a liquid or a gas.

6. The transducer according to claim 1, wherein the piezoelectric or the electrostrictive vibrator comprises of a ceramic, a crystal, a polymer, or a composite.

7. The transducer according to claim 1, wherein the one or more matching layers comprise of at least one of metals, alloys, plastics, epoxies, rubbers, composites.

8. The transducer according to claim 1, wherein the piezoelectric or the electrostrictive further comprises of electrodes to induce vibration and to receive signals.

9. The transducer according to claim 1, wherein the one or more matching layers comprise of a dual matching layer, wherein the impedance of a first matching layer is lower than the impedance of a second matching layer.

10. The transducer according to claim 9, wherein the first matching layer, beside the piezoelectric or the electrostrictive, is polymer.

11. The transducer according to claim 9, wherein the second matching layer, beside the front side propagation medium, is a metal.

12. The transducer according to claim 9, wherein the first matching layer comprises of a group consisting of silicone, polyurethane, polycarbonate, polyethylene, polyester, acrylic, glass, and aluminum.

13. The transducer according to claim 9, wherein the second matching layer comprises of a group consisting of polycarbonate, polyethylene, polyester, acrylic, aluminum, copper, steel, stainless steel, brass, and zinc.

14. The transducer according to claim 1, wherein the at least one matching layer has a characteristic acoustic impedance that is less than that of the front side propagation medium.

15. The transducer according to claim 1, wherein a frequency at which a maximum power transfer occurs is different than a resonance frequency of the transducer.

16. A method of making a resonant type transducer, comprising the steps of:

a) selecting a piezoelectric or an electrostrictive vibrator;

b) acoustically coupling a backing layer to a back side of the piezoelectric or the electrostrictive vibrator, wherein a combination of the piezoelectric or the electrostrictive vibrator, the backing layer, and a backside propagation medium define a first equivalent acoustic impedance;

c) acoustically coupling one or more matching layers to a front side of the piezoelectric or the electrostrictive vibrator, wherein a combination of the one or more matching layers, and a front side propagation medium define a second equivalent acoustic impedance;

d) changing thicknesses at least one of materials of the one or more matching layers until the second equivalent acoustic impedance is a complex conjugate impedance to the first equivalent acoustic impedance.

* * * * *